United States Patent [19]
Hasson

[11] Patent Number: 5,625,452
[45] Date of Patent: Apr. 29, 1997

[54] PASSIVE DETECTION OF SOURCE OF KNOWN SPECTRAL EMISSION

[75] Inventor: Victor H. Hasson, Winchester, Mass.

[73] Assignee: Textron Systems Corporation, Wilmington, Mass.

[21] Appl. No.: 506,805

[22] Filed: Jul. 25, 1995

[51] Int. Cl.$^6$ ............................................. G01J 3/28
[52] U.S. Cl. ................ 356/326; 250/252.1; 364/423.098
[58] Field of Search .................... 356/407, 411, 356/416, 419, 425, 326, 300, 318, 328, 418, 28, 28.5, 5; 250/252.1; 364/424.01

[56] References Cited

U.S. PATENT DOCUMENTS 4,694,172  9/1987  Powell ................................. 250/349
5,329,595  7/1994  Davies ................................. 382/17

OTHER PUBLICATIONS

Helicopter Plume Detection By Using an Ultranarrow–Bond Noncoherent Laser Doppler Velocimeter by: S. H. Bloom et al., Optics Letters, vol. 18, No. 3, Feb. 1, 1993 at pp. 244–246.

Primary Examiner—Frank Gonzalez
Assistant Examiner—Michael P. Stafira
Attorney, Agent, or Firm—Perman & Green, LLP

[57] ABSTRACT

A system and method of passive detection of a luminous target employs a prior knowledge and a present measurement of its electromagnetic spectrum during a target acquisition procedure and, subsequently, during analysis of the spectrum to determine the presence of Doppler shift and broadening of lines of the spectrum. The prior known reference spectrum is adjusted for the Doppler shift so as to enable identification of the corresponding spectral lines of the received target spectrum. A history of the spectral data enables an identification of the type of target, as in the case of a rocket, and a determination of characteristics of a flight of the rocket.

9 Claims, 4 Drawing Sheets

/ 1

PASSIVE DETECTION OF SOURCE OF KNOWN SPECTRAL EMISSION

BACKGROUND OF THE INVENTION

This invention relates to passive detection and identification of a source of electromagnetic radiation and, more particularly, to detection of hot gasses undergoing rapid motion, as in a rocket plume, by examination of spectral line broadening due to particle collisions, and by examination of Doppler shifting of the spectral lines due to particle motion in a known emission spectrum of the constituent gasses of a plume, thereby to identify the source of the radiation.

Various objects, such as the plume of a rocket or fire, or gas discharge of a lamp, are known to act as sources of radiation having characteristic spectra. There are situations in which it is desirable to detect and/or identify such a source from a viewing site distant from the source. However, a problem arises in that the usual apparatuses for detecting and identifying such a source, or target, such as active radar by way of example, are not operative with the foregoing type of radiant energy signal for a passive determination of the presence and identity of the source.

SUMMARY OF THE INVENTION

The aforementioned problem is overcome and other advantages are provided by a system and method of detection, in accordance with the invention, wherein a suitable target, or distant source of radiation, is identified by its electromagnetic spectrum during a target acquisition procedure and, thereafter, the spectrum of the radiation is analyzed to determine characteristics of the target including movement of the target. In the practice of the invention, prior knowledge of the spectrum of radiation, as emitted by the target, is employed in both the acquisition and the analysis stages. In the analysis, there is recognition of any presence of Doppler frequency shift, and any broadening of spectral lines as compared to a known reference spectrum so as to enable identification of the corresponding spectral lines of the received target spectrum, as well as characteristics, such as movement, of the source of radiation.

In accordance with the theory of the invention, a source of radiation, such as a rocket plume, emits radiation characterized by a known set of spectral emission lines and/or emission bands. As the radiation propagates from the source and through the atmosphere, constituents of the atmosphere interact with the radiation to attenuate the radiation by absorption of the various spectral bands selectively by the various atmospheric constituents. Therefore, measurement of the ratios of intensities of radiations at the various spectral bands at a distance from the source will differ from the same measurements performed at the location of the source because of the selective absorption of the radiation at its various spectral bands. The absorption is dependent also on atmospheric conditions. By way of example, in the case of a rocket plume or a forest fire, the frequencies of the spectral lines are not affected by the atmosphere, the frequencies being dependent only on the constituent gasses of the source and on movement of the gasses of the source. Thereby, a study of Doppler shift and spectral line broadening enables detection and identification of a target.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element in the different figures.

DETAILED DESCRIPTION

Figure 1:
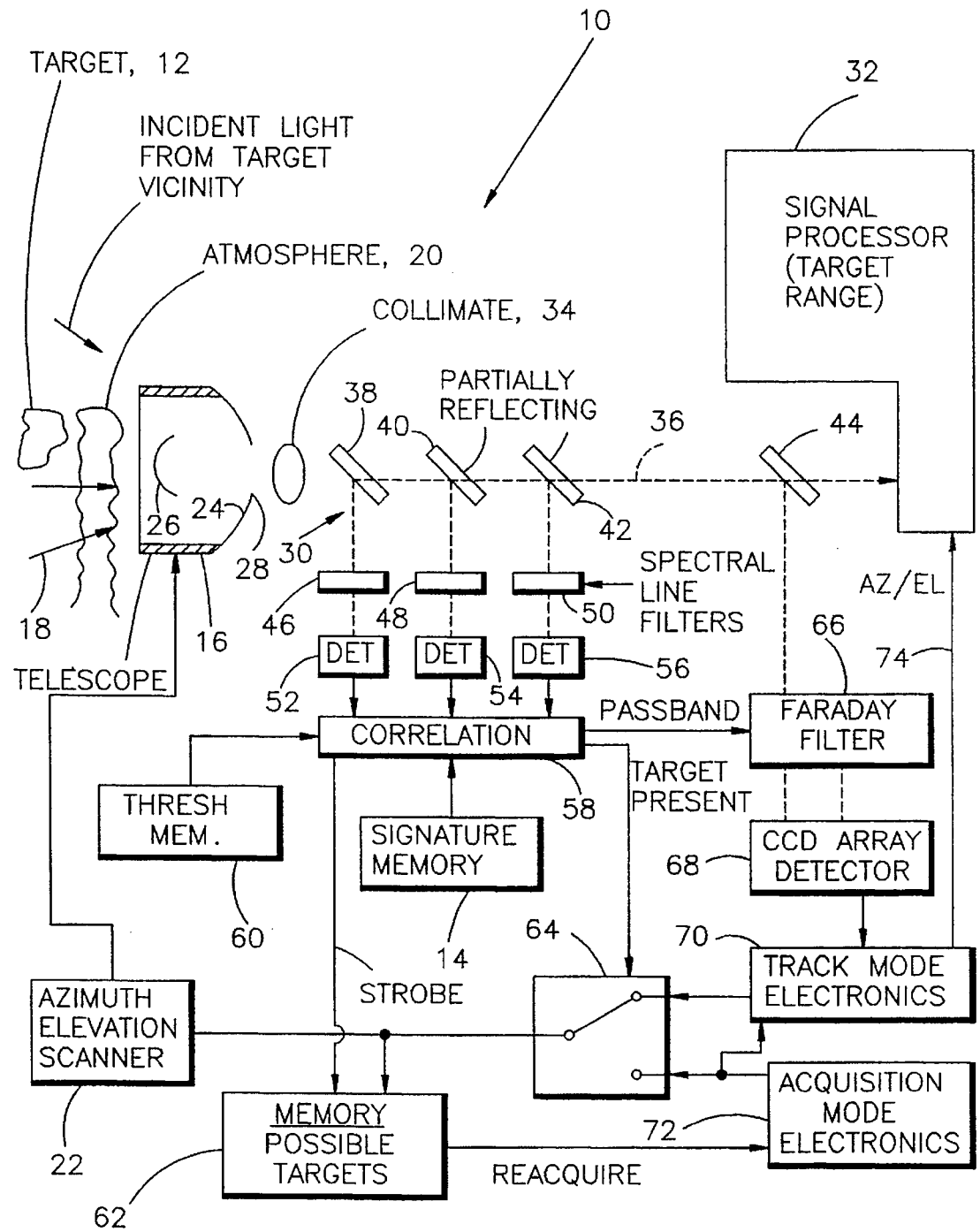
FIG. 1 is a block diagram of an electrooptic system useful in the practice of the invention.
Figure 2:
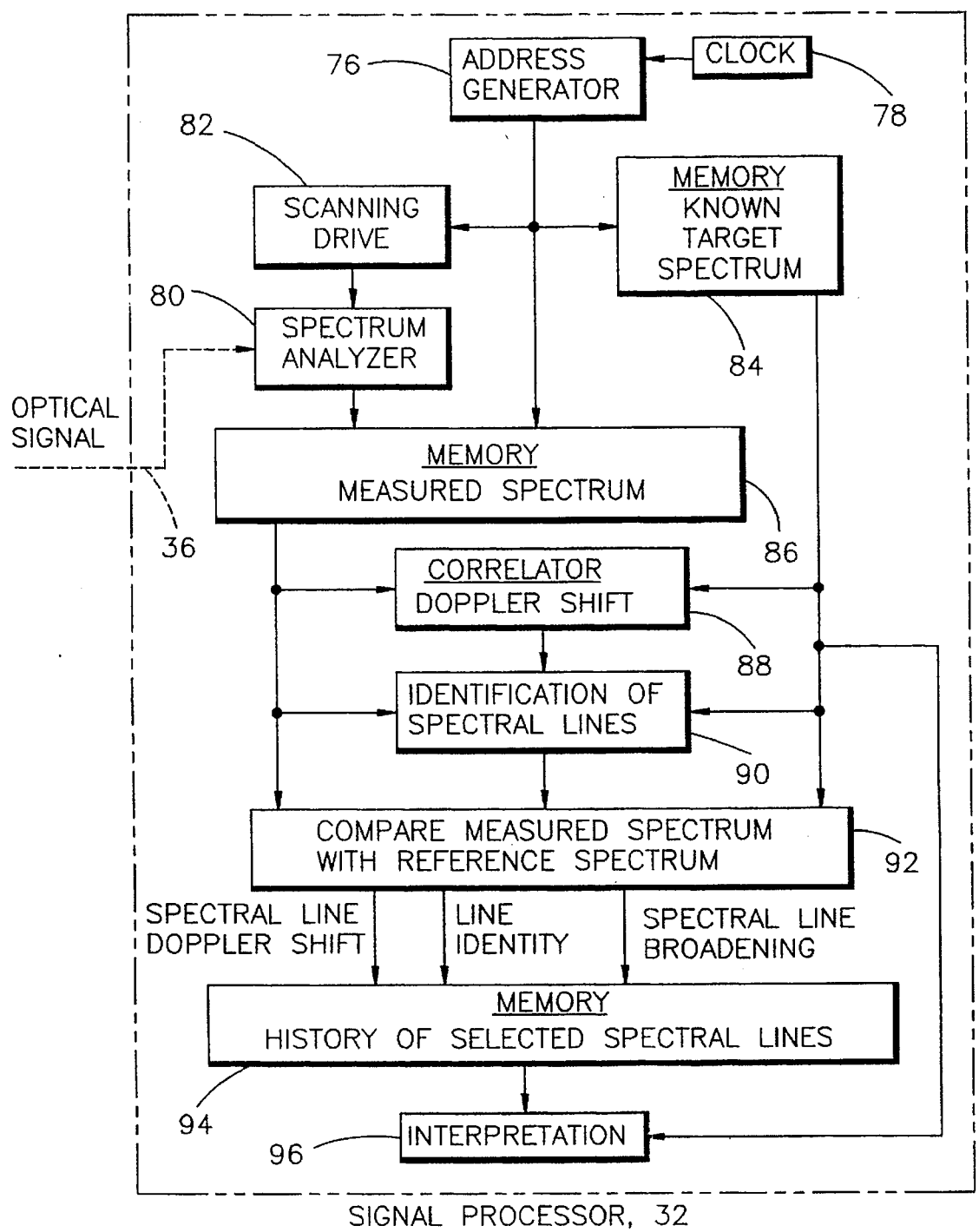
FIG. 2 is a block diagram of a signal processor forming a part of the system of FIG. 1.
Figure 3:
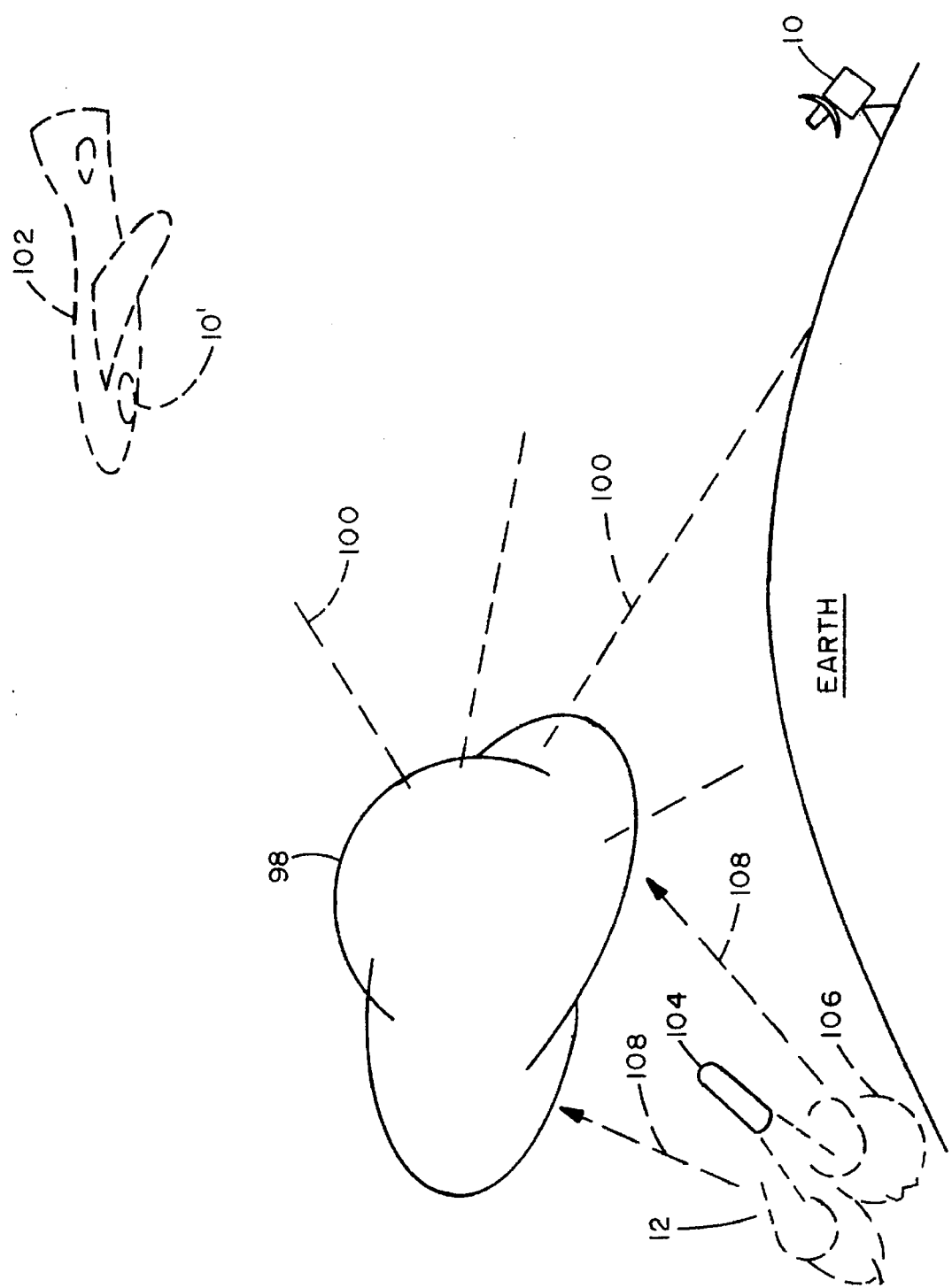
FIG. 3 shows, diagrammatically, a viewing of target radiation reflected or scattered through a cloud by the electrooptic system of the invention, wherein the system may be carried by a vehicle on the ground or an airborne vehicle.
Figure 4:
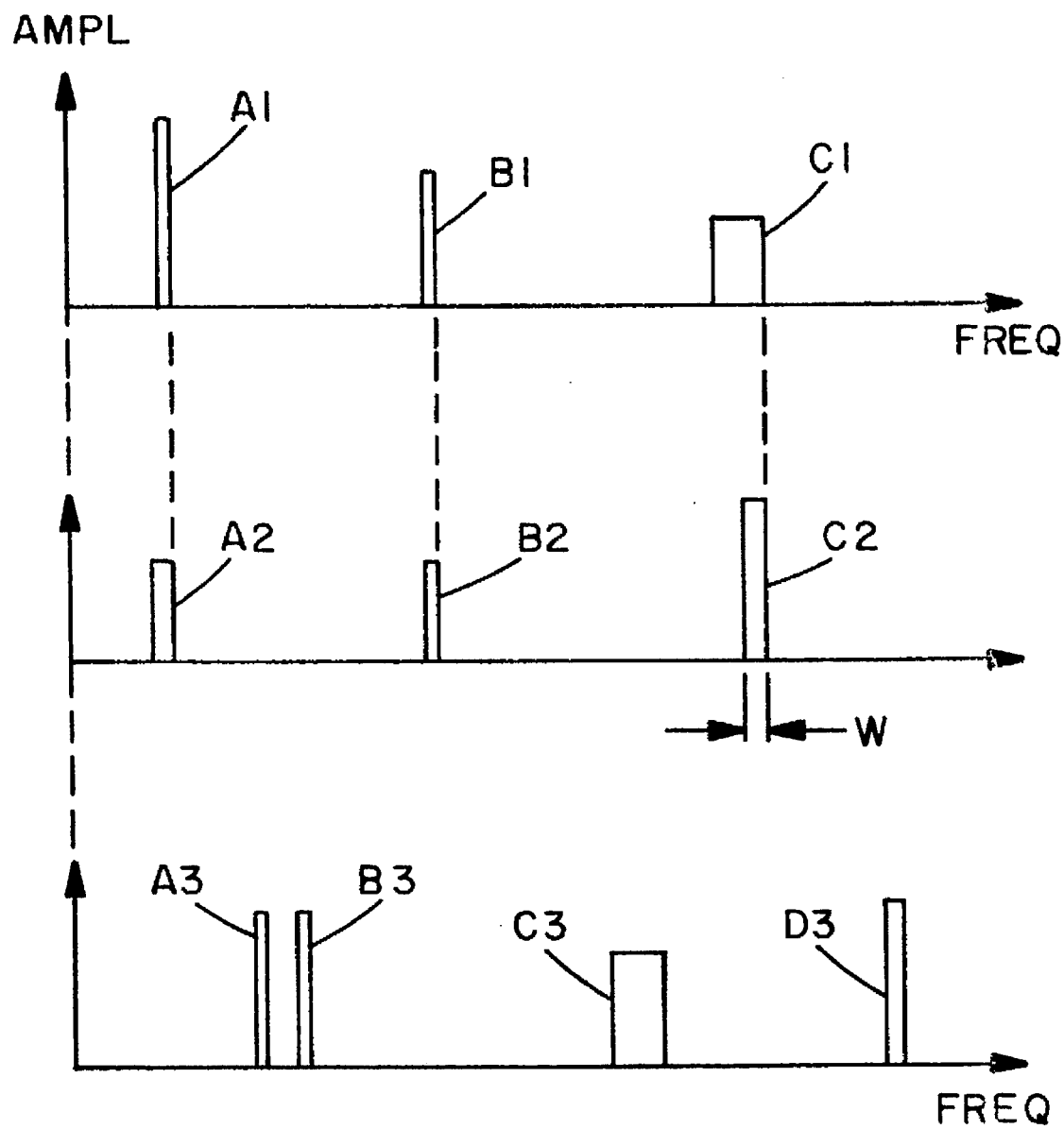
FIG. 4 is a stylized representation of the frequency spectrum of electromagnetic radiation emitted by a target with three significant spectral lines, the figure showing Doppler shift and spectral line broadening relative to a know spectrum.

The invention provides for examination of a received spectrum of radiation emanating from a distant source, thereby to identify the source of the radiation and other characteristics such as a rate of burning of a rocket plume and, possibly, movement of the source. However, prior to examination of the spectrum, and in accordance with a preferred embodiment of the invention, it is useful to provide an electrooptic system for detection of a radiant source which is a candidate for spectral examination. FIG. 1 shows such a system 10 for obtaining passively spectral data of electromagnetic radiation emitted by a distant radiant source, represented by a target 12, and for tracking the target 12 during examination of its spectrum. FIGS. 2–4 show operation of the invention for obtaining identification and other data of the radiant source from examination of the spectrum of the radiation observed by the system 10.

With reference to FIG. 1, and in accordance with the invention, the electromagnetic radiation emitted by the target 12 has a known spectrum, or target signature, which is stored in a signature memory 14. The system 10 includes a telescope 16 which views electromagnetic radiation, indicated as a plurality of light rays 18, which propagates through the atmosphere 20 to be incident upon the telescope 16. The telescope 16 is steered mechanically in azimuth and in elevation by a scanner 22 which enables the telescope 16 to scan through space to determine whether the target 12 as well as other targets may be present. By way of example, the telescope 16 is shown in a Cassegrain form having a main mirror 24 and a secondary mirror 26, the latter reflecting light through an aperture 28 in the main mirror 24 to an optical assembly 30.

The optical assembly 30 provides an optical path from the telescope 16 to a signal processor 32 of the system 10. The signal processor 32 operates, in a manner to be described with reference to FIG. 2, for extracting spectral data from the target radiation. The optical assembly 30 comprises a collimating lens 34 for establishing a beam 34 of parallel rays suitable for operation of the signal processor 32. In addition, the optical assembly 30 comprises four partially reflecting mirrors 38, 40, 42, and 44 for tapping off portions of the optical energy of the beam 36 to be used for purposes of acquiring and tracking the target 12.

The system 10 further comprises three spectral line filters 46, 48, and 50, three detectors 52, 54, and 56 of target radiation received by the telescope 16, and a correlation unit 58. The radiation emitted by the target 12 may include a continuous portion of the spectrum, as in black body radiation, and/or specific spectral lines of interest in characterizing the nature of the target 12. In operation, a portion of the optical energy of the beam 36 is reflected by the mirror 38 via the filter 46 to the detector 52, the detector 52 converting the optical energy to an electrical signal which is applied to the correlation unit 58. In similar fashion, optical energy reflected by the mirror 40 propagates via the filter 48 to the detector 54 to be converted to an electrical signal which is applied to the correlation unit 58. Also, optical energy reflected by the mirror 42 propagates through the filter 50 to be converted by the detector 56 to an electrical signal which is applied to the correlation unit 58.

The filters 46, 48, and 50 provide different passbands for the propagation of the optical energy of the beam 36. This enables each of the filters 46, 48, and 50, in conjunction with the respective one of the detectors 52, 54 and 56, to view only a specific portion of the spectrum of the target radiation while discarding the balance of the radiation. Thereby, the detectors 52, 54, and 56 signal the presence of specific spectral bands wide enough to capture corresponding spectral lines with possible Doppler shift and line broadening thereon, but sufficiently narrow to discern the various spectral lines of interest. The absence of a signal outputted by any one of the detectors 52, 54, and 56 is an indication of the absence of the corresponding spectral region or line from the spectrum of the target radiation. It is to be noted that the use of three signal channels provided by the three mirrors 38, 40, and 42 in combination with the three filters 46, 48, and 50, and the three detectors 52, 54, and 56 is presented by way of example and that, in practice, more of these signal channels may be employed for observation of additional spectral regions of the target spectrum. The correlation unit 58 obtains a best fit between incoming spectral data, which may be Doppler shifted in the event of target motion, and the known spectrum of the target radiation stored in the signature memory 14. Thresholds, stored in a memory 60, are employed by the correlation unit 58 in a decision process of the correlation unit 58 for deciding if a specific spectral line is considered to be present.

The system 10 further comprises a memory 62 for storing the locations of possible targets in terms of azimuth and elevation address, a switch 64 operated by the correlation unit 54, a Faraday filter 66, a detector assembly 68 comprising an array of charge-coupled devices (CCD) providing a two-dimensional viewing of target image data on the beam 36, a track-mode electronics unit 70, and an acquisition mode electronics unit 72. In operation, optical energy extracted from the beam 36 by the mirror 44 propagates via the Faraday filter 66 to the detector assembly 68. The use of the Faraday filter 66 is well known, such use being described in an article entitled HELICOPTER PLUME DETECTION BY USING AN ULTRANARROW-BAND NONCOHERENTLASER DOPPLER VELOCIMETER by S. H. Bloom et al. appearing in OPTICS LETTERS, Vol. 18, No. 3, Feb. 1, 1993 at pages 244–246.

The optical passband of the Faraday filter 66 is dependent on the strength of the magnetic field of the filter, and a specific spectral region of the incoming radiation may be selected for viewing via the filter 66 by adjustment of the magnetic field strength. The magnetic field strength is set by a passband signal outputted by the correlation unit 58 for selection of a desired spectral region to be received by one or more of the detectors 52, 54, and 56. The rays of light passing through the filter 66 retain their relative directions of orientation so that the detector assembly 68 is able to determine whether the source of the target radiation appears to be above or below the boresight axis of the telescope 16, or to the right or the left of the boresight axis. Thereby, the detector assembly 68 provides an error signal to the track-mode electronics unit 70 which indicates whether the telescope 16 is to be repositioned or oriented by the scanner 22 during a tracking of the target 12.

The acquisition-mode electronics unit 72 is operative to provide electric signals to the scanner 22 for directing the telescope 16 to scan a designated portion of space during the acquisition mode. The decision as to whether to enter the acquisition mode or the tracking mode is made by the correlation unit 58. Initially, the switch 64 is in the acquisition position for coupling signals from the acquisition-mode electronics unit 72 to the scanner 22. During the acquisition process, any possible targets noted by the correlation unit 58 are entered into the memory 62. This is accomplished by an output signal of the correlation unit 58 which strobes the memory 62 to store the azimuth and elevation command signals outputted by the acquisition-mode electronics unit 72 to the scanner 22. The storage of the possible target locations in the memory 62 is useful for entering a reacquisition mode wherein the electronics unit 72 scans a region of space around a possible target to ascertain the target coordinates in azimuth and in elevation.

The acquisition-mode electronics unit 72 outputs the target coordinates to the track-mode electronics unit 70 during a hand-off procedure wherein the switch 64 is operated to disconnect the acquisition-mode electronics unit 72 from the scanner 22 and to connect the track-mode electronics unit 70 to the scanner 22. This operation of the switch 64 occurs upon the determination by the correlation unit 58 that a target is present. The azimuth and elevation (AZ/EL) coordinates of the target being tracked are applied by the track-mode electronics unit 70 to the signal processor 32, via line 74, for use in identifying a specific target by its angular coordinates.

As shown in FIG. 2, the signal processor 32 comprises an address generator 76 driven by a clock 78, and a spectrum analyzer 80 which receives the beam 36 (FIG. 1) and is driven by a scanning drive 82. The signal processor 32 further comprises two memories 84 and 86 which are addressed by the address generator 76. The memory 84 stores known target spectral data for the target 12 (FIG. 1) as well as for other targets which may be viewed by the telescope 16 (FIG. 1). The memory 86 stores spectral data of the target 12 obtained by operation of the spectrum analyzer 80. The address provided by the generator 76 is in terms of the frequency coordinate in a graph of amplitude versus frequency for the target spectral data. The generator 76 is operative also to address the scanning drive 82 to drive the spectrum analyzer 80 to a specific frequency during a scanning of the spectrum. Operation of the drive 82 may be either mechanical or electrical depending on the construction of the spectrum analyzer 80.

By way of example, in the use of the spectrum analyzer 80, emission lines of sodium and potassium are discerned readily in the hot plumes of rockets by atomic line filters, such as the filters 46, 48, and 50 (FIG. 1) and by the spectrum analyzer 80. The use of such an analyzer is disclosed in the aforementioned article of S. H. Bloom et al. The sodium and the potassium spectral lines are presented by way of example, and numerous other lines may be observed, depending on chemistries of the sources of radiation. In atomic spectroscopy, there are well-known doublet lines appearing in the spectrum which also serve to identify a source of the radiation.

The signal processor 32 further comprises a correlator 88 for correlating measured spectral data for the line spectrum stored in the memory 86 with the known spectral data stored in the memory 84 to determine whether there has been a shift of the spectral lines along the frequency axis, such shift being a Doppler shift and being indicative of target motion in a radial direction along the axis of the telescope 16. The Doppler shift along with the measured and the known spectral data are applied to an identification unit 90 which subtracts the Doppler from the measured spectral data to match the measured spectral lines with the lines of the known spectrum and, thereby, identify the various spectral lines which are being measured. In order to assure that examination is made of only those specific spectral lines having amplitudes well above that of any continuous spectrum of radiation which may be present, a threshold is set in the spectrum analyzer 80. The threshold is above the amplitude of such continuous radiation, and only such spectral lines which exceed the threshold are recorded in the memory 86. The data stored in the memory 86 is, therefore, a line spectrum of the target 12, and does not include data as to any continuous spectrum of radiation which may also be radiated by the target 12. Thereby, the identification unit 90 identifies the various spectral lines which are of interest in characterizing the target 12.

Furthermore, the signal processor 32 comprises a comparison unit 92, a memory 94, and an interpretation unit 96. The measured spectral lines outputted by the memory 86 and their identity, outputted by the identification unit 90, are applied to the comparison unit 92 along with the known spectral data which is applied to the comparison unit 92 by the memory 84. For each spectral line of interest, the comparison unit 92, compares the measured data with the known data to determine the Doppler frequency shift and the width of each spectral line. This information is stored in the memory 94. The system 10 (FIG. 1) continues to provide further data of the target 12 over a period of time. Thus, by way of example, in the case wherein the target 12 is the plume of a rocket traveling along a fight path, the spectral data may change with time as the plume undergoes changes in its burning. The spectral data is continuously updated by the system 10, and the updated data is stored in the memory 94 along with the earlier data which is retained in the memory 94. The stored data provides a history of the line spectrum. The history is employed by the interpretation unit 96 which interprets the line spectrum to identify the constituent components of the plume which may serve as an identification of the type of rocket, the time of launch based on the nature of the plume, and information describing movement of the target 12.

By way of example, the interpretation unit 96 employs information, stored in the memory 84, describing plume characteristics as a function of Doppler shift and as a function of line width for the spectral lines of various line spectra. Such data may be stored also for latter times of flight to permit identification of target characteristics based on a development of the flight history. If desired, the functions of the correlator 88, the identification unit 90, the comparison unit 92, and the interpretation unit 96 can be accomplished by a computer programmed to perform these functions.

With reference to FIG. 3, the system 10 may view radiation from the target 12 in a situation, wherein the target 12 is located beyond the earth's horizon, by observation of radiant energy emitted by the target 12 and reflected from a cloud 98 via rays 100 of radiation. Typically, the system 10 is located on the earth's surface, as indicated in solid lines, or is provided as an airborne system 10' carried by an aircraft 102, as indicated in phantom view. FIG. 3 shows the situation wherein the target 12 is a rocket 104 emitting a plume 106 which is a source of radiation 108 reflected via the rays 100 from the cloud 98 to be viewed by the system 10.

FIG. 4 provides stylized representations of two line spectra emitted by two different types of rockets having similar constituent substances in their plumes (first two graphs), and a line spectrum of a rocket plume having a different set of constituent substances in its plume (third graph). These graphs represent possible spectra emitted by the rocket plume 106 (FIG. 3). The horizontal axis shows frequency, and the vertical axis shows amplitude. The first line spectrum has lines A1, B1 and C1, and the second line spectrum has lines A2, B2 and C2. The line A2 is broadened by particle collisions in the plume so as to have a greater width W than the line A1. The lines B1 and B2 have the same width W, and the line C1 has a greater width W than does the line C2. Also, the amplitudes of the lines of the first spectrum differ in amplitude from the lines of the second spectrum. The third spectrum has lines A3 and B3 which represent a doublet, and further lines C3 and D3. The spectral lines of the third graph differ in frequency from the spectral lines of the first two graphs. The graphs of FIG. 4 show the type of data which is stored in the memory 84, and in the memory of the interpretation unit 96. The graphs of FIG. 4 demonstrate how two rocket plumes having essentially the same spectral lines can still differ in their spectra by virtue of relative amplitudes and widths of the spectral lines. Such a difference can occur, by way of example, by changes in the manner of burning of gasses in the plume during flight of the rocket. In the case of rockets employing different propellants, there would be a greater difference between their spectra because the lines of the respective spectra would be at different frequencies, as indicated above in the third graph.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A system for passive detection of a source of known spectral emission, comprising:

optical apparatus for receiving radiation propagating from the source;

means for storing a known spectrum of the radiation as emitted by the source, said known spectrum having at least a first known spectral line and a second known spectral line;

means operatively coupled to said optical apparatus for analyzing a received spectrum of the radiation as received by said optical apparatus, said received spectrum having at least a first received spectral line and a second received spectral line;

means for comparing spectral lines of the received spectrum with spectral lines of the known spectrum to determine a presence of Doppler frequency shift and a broadening of line width in at least one received spectral line of the received spectrum; and means responsive to measurements of frequency shift and line width in said at least one received spectral line for identification of the source of radiation.

2. A system for passive detection of a source of known spectral emission, comprising:

optical apparatus for receiving radiation propagating from the source;

means for storing a known spectrum of the radiation as emitted by the source, said known spectrum having a plurality of known spectral lines;

means operatively coupled to said optical apparatus for analyzing a received spectrum of the radiation as received by said optical apparatus, said received spectrum having at least a plurality of received spectral lines;

means for comparing spectral lines of the received spectrum with spectral lines of the known spectrum to determine a presence of Doppler frequency shift in a plurality of received spectral lines of the received spectrum;

means responsive to measurements of frequency shift in said plurality of received spectral lines for identification of said plurality of received spectral lines; and means for identifying the source of radiation based on the identification of said plurality of received spectral lines.

3. A system for passive detection of a source of known spectral emission, comprising:

optical apparatus for receiving radiation propagating from the source;

means for storing a known spectrum of the radiation as emitted by the source, said known spectrum having at least a first known spectral line;

means operatively coupled to said optical apparatus for analyzing a received spectrum of the radiation as received by said optical apparatus, said received spectrum having at least one received spectral line;

means for comparing spectral lines of the received and the known spectra to determine a presence of a broadening of the width of said at least one received spectral line; and means responsive to a measurement of line width of said at least one received spectral line for identification of the source of radiation.

4. A system according to claim 1 wherein said optical apparatus includes a signature memory and means for correlating the received spectrum with a reference spectrum of said signature memory to determine the presence of a possible source of radiation.

5. A system according to claim 1 wherein said source undergoes motion relative to said optical apparatus, and said optical apparatus includes means for tracking the source.

6. A method of passive detection of a source of known spectral emission, comprising steps of:

receiving radiation propagating from the source;

storing a known spectrum of the radiation as emitted by the source, said known spectrum having at least a first known spectral line and a second known spectral line;

analyzing a received spectrum of the radiation, said received spectrum having at least a first received spectral line and a second received spectral line;

comparing spectral lines of the received spectrum with spectral lines of the known spectrum to determine a presence of Doppler frequency shift and a broadening of line width in at least one received spectral line of the received spectrum; and identifying the source of radiation from measurements of frequency shift and line width in said at least one received spectral line.

7. A method according to claim 6 wherein said receiving step is accomplished by means of optical apparatus, and the radiation propagates through the atmosphere toward the optical apparatus, the atmosphere having a cloud, and wherein said receiving step is accomplished by viewing a portion of the radiation which is reflected from the source by the cloud toward the receiving apparatus.

8. A method for passive detection of a source of known spectral emission, comprising steps of:

receiving radiation propagating from the source; storing a known spectrum of the radiation as emitted by the source, said known spectrum having a plurality of known spectral lines;

analyzing a received spectrum of the radiation, said received spectrum having at least a plurality of received spectral lines;

comparing spectral lines of the received spectrum with spectral lines of the known spectrum to determine a presence of Doppler frequency shift in a plurality of received spectral lines of the received spectrum;

identifying said plurality of received spectral lines by use of said known spectrum and measurements of frequency shift in said plurality of received spectral lines; and identifying the source of radiation based on the identification of said plurality of received spectral lines.

9. A method for passive detection of a source of known spectral emission, comprising steps of:

receiving radiation propagating from the source;

storing a known spectrum of the radiation as emitted by the source, said known spectrum having at least a first known spectral line;

analyzing a received spectrum of the radiation, said received spectrum having at least one received spectral line;

comparing spectral lines of the received and the known spectra to determine a presence of a broadening of the width of said at least one received spectral line;

repeating the foregoing steps for obtaining an updated data of the broadening of the spectral line width while retaining an earlier data of the broadening of the spectral ling width;

storing the updated and the earlier data of the broadening of the spectral line width to provide a history of the line spectrum; and employing the history of the line spectrum in identifying the source of radiation from a measurement of line width of said at least one received spectral line.

* * * * *